Nov. 12, 1963   H. G. HEINRICH   3,110,459
PARACHUTE
Filed Aug. 29, 1961   4 Sheets-Sheet 2

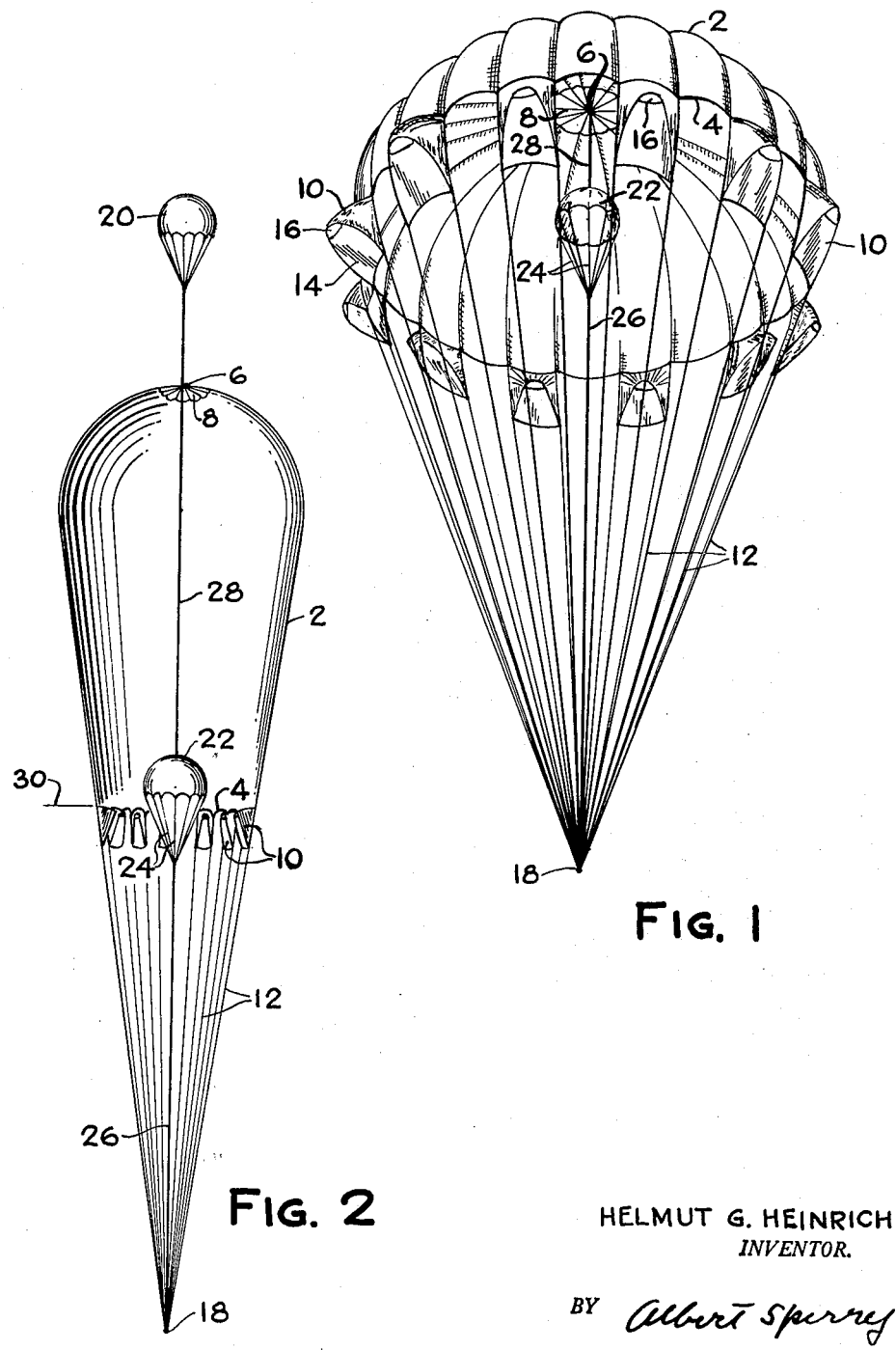

HELMUT G. HEINRICH
INVENTOR.

BY *Albert Sperry.*

ATTORNEY

Nov. 12, 1963  H. G. HEINRICH  3,110,459
PARACHUTE

Filed Aug. 29, 1961  4 Sheets-Sheet 4

HELMUT G. HEINRICH
INVENTOR.

BY Albert Sperry

ATTORNEY

United States Patent Office 3,110,459
Patented Nov. 12, 1963

3,110,459
PARACHUTE
Helmut G. Heinrich, 231 W. Elmwood Place,
Minneapolis, Minn.
Filed Aug. 29, 1961, Ser. No. 134,602
7 Claims. (Cl. 244—149)

This application is a continuation-in-part of copending application Serial No. 833,061 filed August 11, 1959.

This invention relates to parachutes and is directed particularly to constructions which increase the rate of inflation of such parachutes as guide surface parachutes, ribbon chutes, ring slot chutes, ring sail chutes and others which are designed to open relatively slowly and to reduce the "shock load" applied to the canopy and its load upon deployment of the canopy.

When a parachute is drawn from the pack or enclosure in which it is housed, the canopy is elongated and the air which first enters the skirt of the canopy acts somewhat like a venturi in that it tends to oppose the spreading or radial movement of the skirt portion of the canopy. While all parachutes are subject to some delay in opening by reason of the venturi action, those parachutes having a "flat" canopy open rapidly enough to permit their use at relatively low altitudes. On the other hand, the shock loading developed on inflation of a flat parachute canopy is relatively high with the result that flat parachute canopies cannot be used for release at speeds in excess of about 350 miles per hour.

Guide surface parachutes, ribbon chutes, ring slot chutes and ring sail chutes are characterized by the low opening shock developed and, therefore, can be employed at speeds in excess of 400 miles per hour. However, in the case of the guide surface parachute, the guide surface extensions on the skirt of the canopy tend to oppose rapid inflation of the canopy with the result that it opens more slowly than the conventional flat parachute canopy. On the other hand, those parachutes such as the ribbon chute, ring slot chute and the ring sail chute have multiple vents located between the peak and skirt of the canopy through which air may escape with the result that they also tend to open rather slowly. For these reasons, there has been some reluctance to use those parachutes which are characterized by slow opening of the canopy where escape from an aeroplane at low altitudes may be necessary.

In accordance with the present invention, slow opening parachutes are constructed in such a way as to increase the rate of inflation whereby they may be caused to open as rapidly, and in some cases, even more rapidly than the conventional flat type parachute, whereas the shock loading of the parachute is increased but little and is substantially less than that of a flat type parachute.

These results are preferably attained by providing a secondary or air deflecting parachute of relatively small size which is located at or adjacent the plane of the skirt of the parachute canopy when the canopy is in the elongated form which it assumes when first drawn from a pack or enclosure. The secondary parachute is positioned in the mouth or throat of the elongated parachute and serves to deflect the inrushing air radially outward toward the skirt of the canopy whereby the skirt is expanded and the rate of inflation of the parachute may be materially increased.

Accordingly, the principal object of the present invention is to increase the rate of inflation of slow opening parachutes.

Another object of the invention is to decrease the time required for inflation of guide surface, ribbon, ring slot and ring sail type parachutes while limiting the shock loading of the parachute.

A specific object of the invention is to provide a slow opening parachute with a secondary or air deflecting parachute located adjacent the plane of the skirt of the parachute when withdrawn from a pack or enclosure.

These and other objects and features of the present invention will appear from the following description thereof wherein reference is made to the figures of the accompanying drawings.

In the drawings:

FIG. 1 is a perspective illustrating a typical guide surface parachute embodying the present invention;

FIG. 2 is a diagrammatic sectional view through a guide surface parachute embodying the present invention with the main parachute canopy in a partially opened position;

Figure 3:
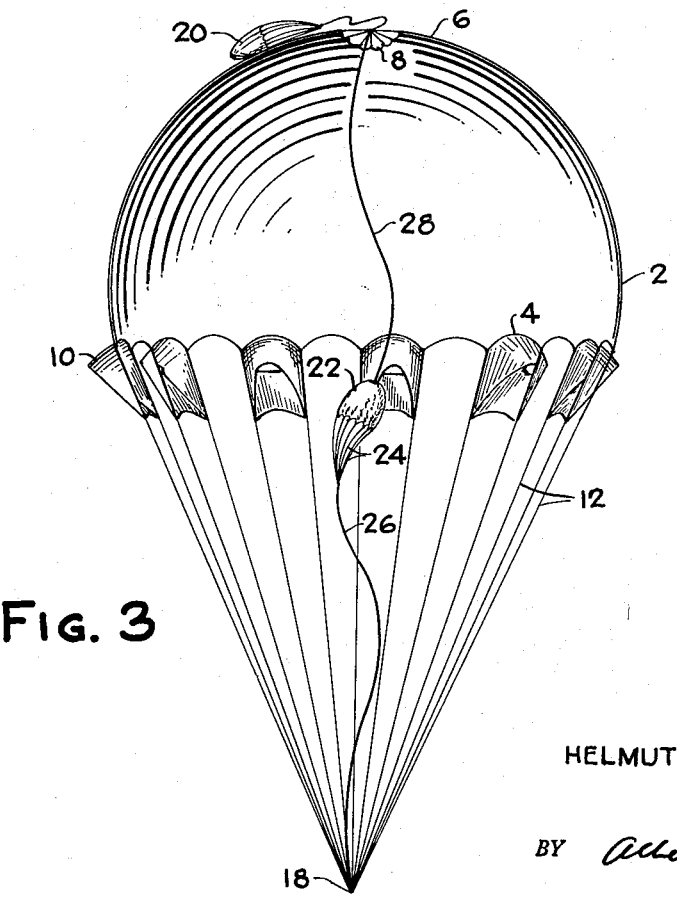
FIG. 3 is a view similar to FIG. 2 but showing the main parachute canopy in a fully opened position.

In that form of the invention chosen for purposes of illustration in FIGS. 1 to 3, the parachute has a main canopy indicated at 2 which is provided with a skirt or marginal edge 4 whereas the peak 6 of the canopy is provided with a vent 8. Further, as shown in FIG. 1, the parachute canopy is of the guide surface type and has spaced downwardly extending air deflecting elements 10 which are secured between the shroud lines 12 and present outwardly inclined guide surfaces 14 which may be provided with air escape vent holes 16.

The lower ends of the shroud lines 12 of the parachute are connected to one or more points 18 such as the ends of the lift webs of a parachute harness. The upper portions of the shroud lines may extend over the canopy and may cross the vent 8, and a pilot chute 20 is connected to the peak of the canopy by a suitable bridle or the like.

In accordance with the present invention, a secondary or air deflecting parachute 22 is positioned adjacent the plane of the skirt 4 of the main parachute canopy. For this purpose, the secondary parachute is provided with its own shroud lines 24 which are connected to an anchor line 26 secured to the point 18 where the shroud lines 12 of the main parachute canopy are connected to the load to be supported. The peak of the secondary parachute 22 is connected to the peak 6 of the main parachute by a stay line 28.

Experiments have demonstrated that the most effective results are attained when the diameter of the canopy of the secondary parachute 22 is about one eighth the diameter of the main parachute canopy. However, the secondary parachute canopy may have a diameter of from about 10 to 20% of the diameter of the skirt 4 of the main guide surface parachute canopy, if desired.

With this construction, and when using a slow opening parachute canopy 30 feet in diameter, it is found that the air first entering the main parachute canopy will cause the canopy to assume a form generally similar to that shown in FIG. 2. The diameter to which the skirt or marginal edge 4 of the main canopy is expanded is then momentarily in the neighborhood of 5 feet, at which time the usual venturi or expansion delaying effect will be exerted on the skirt.

In the absence of the secondary parachute of the present invention, the further expansion of the main canopy is relatively slow. Thus, when the main parachute canopy embodies guide surface extensions such as those shown at 10 in FIG. 1, the outward expansion of the skirt of the canopy may be further delayed, whereas when the canopy is of the ribbon, ring slot or ring sail type which has multiple air vents between the peak and skirt of the canopy, the venturi action is increased while the radially directed pressure of the air within the canopy is reduced with the result that the canopy opens relatively slowly.

The secondary parachute of the present invention, being connected to the load by anchor line 26 and to the peak by the stay line 28, is centered within the throat of the partially opened parachute canopy as shown in FIG. 2. The secondary parachute, therefore, is opened fully and instantly by the first blast of air entering the main parachute canopy. As a result, it occupies nearly one half of the area of the partially opened skirt of the main parachute canopy and deflects the entering air radially outward away from the center of the canopy and against the skirt. The air deflected by the secondary parachute toward the inwardly drawn skirt 4 serves to expand the skirt of the main parachute canopy whereby it receives more air and expands very rapidly to its fully deployed form of FIG. 3.

Thereafter, as the main parachute canopy is fully expanded, the peak of the canopy is drawn downwardly and the stay line 28 becomes slack whereby the secondary parachute 22 is permitted to descend toward the point 18, as shown in FIG. 3. The secondary parachute 22, therefore, tends to collapse and thereafter has little or no effect upon the operation of the main parachute.

Figure 4:
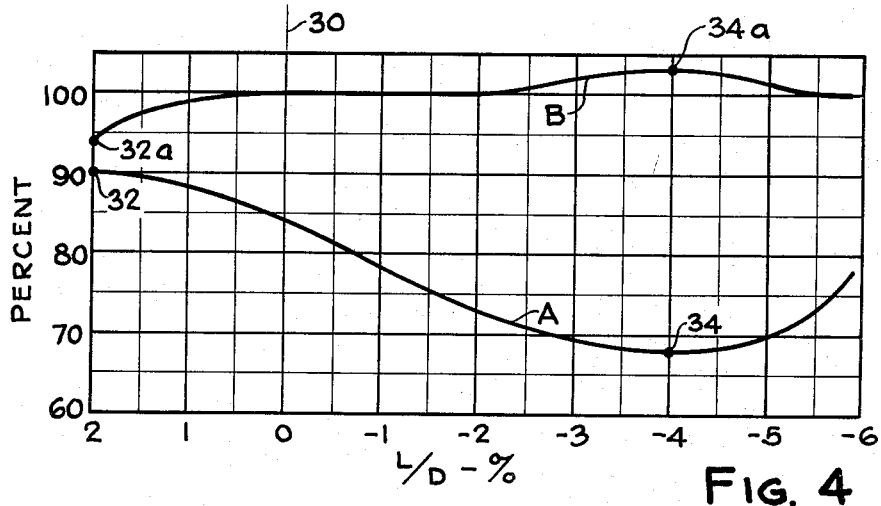
FIG. 4 shows curves indicating the rate of opening and the forces exerted on guide surface parachutes embodying the present invention.

Extended tests have shown that the manner in which the slow opening parachute canopy functions is largely determined by the position of the secondary parachute with respect to the plane of the skirt 4 of the main parachute canopy. As shown in FIG. 4, the plane of the skirt of the main parachute is represented by the line 30, whereas curve A indicates the rate at which the main parachute canopy was caused to inflate in a typical series of tests. The portion of the curve A to the left of the line 30 represents results obtained when the secondary parachute is located in advance or in front of the plane of the skirt of the main parachute canopy, whereas the portion of curve A to the right of the line 30 represents results obtained when the secondary parachute is located within or to the rear of the plane of the skirt of the main parachute canopy. The numbers shown on the horizontal line of FIG. 4 represent distances in terms of percent of the diameter of the main parachute canopy. The numbers on the vertical line 30 represent time in percentages of that required to cause the main canopy to be fully expanded in the absence of the secondary parachute.

It will thus be apparent that the point 32 represents the results attained when the secondary parachute is positioned in advance of the plane 30 a distance equal to 2% of the diameter of the main parachute canopy (approximately 7 inches for a 30 foot canopy). The main parachute canopy is then opened in 90% of the time required for full deployment of the main parachute canopy without the secondary parachute. Similarly, the point 34 shows that when the secondary parachute is located to the rear of the plane of the main parachute canopy a distance equal to 4% of the diameter of the main parachute canopy (about 11 inches for a 30 foot parachute), the canopy will be fully deployed in 68% of the time required if the secondary parachute is omitted.

Curve B indicates the force or opening shock exerted on the main parachute canopy when using a secondary canopy of the present invention. Thus, when the secondary canopy is at the point 32a in advance of the plane of the skirt of the main parachute canopy, the opening shock is reduced by 5% whereas it is increased by about 3% when the secondary parachute is in the position 34a.

These results demonstrate that a slow opening parachute embodying a secondary air deflecting parachute in accordance with the present invention will perform considerably better than conventional parachutes using a solid flat canopy. Thus, prior tests have shown that the time required for an unmodified guide surface parachute to be fully inflated is about 1.25 times as long as that required for full inflation of a solid flat parachute canopy. However, when the guide surface parachute is constructed in accordance with the present invention it will open in about 0.85 times the length of time required for full inflation of a solid flat canopy or about 15% faster. Similarly, prior tests have shown that an unmodified guide surface parachute, when opening, will exert a force which is only about 0.66 times that resulting upon opening of a solid flat parachute canopy, whereas the parachutes of the present invention exert forces which are but little greater than that of previous guide surface parachutes and may even be less.

The use of a secondary parachute as described above in connection with a guide surface parachute results in a similar increase in the rate of expansion of the main parachute canopy with little or no increase in the shock loading developed. It is, therefore, possible to use parachutes embodying the present invention for escape and having a guide surface, ribbon, ring slot or ring sail type of parachute canopy at altitudes as low or lower than those possible when using a flat type parachute canopy and at the same time, the parachutes can be released at speeds which would destroy a flat type parachute canopy or impose excessive shock loading on the parachutist or load attached to the parachute.

The position of the secondary parachute relative to the skirt of the main parachute canopy is readily established by proportioning the length of the anchor line 26 with respect to the length of the shroud lines 12 which extend from the skirt or marginal edge 4 of the main parachute canopy and the point 18 to which the anchor line and the shroud lines are connected. If the length of the anchor line 26 (with the shrouds of the secondary chute) is less than the shroud lines 12, the secondary parachute will be positioned in advance of the plane of the skirt 4 and line 30 when the parachute assumes the form shown in FIG. 2. However, if the length of the anchor line 26 is greater than the shroud lines 12 of the main parachute canopy, the secondary parachute will be located to the rear of the plane of the skirt 4 and line 30. While the length of the anchor line (and the shroud lines of the secondary chute) may be varied for any particular application or use of the present invention, it is necessary in order to attain the advantages of the present invention for the secondary parachute to be located within the limits of 10% of the diameter of the main canopy in front or in the rear of the plane of the skirt of the canopy. The combined length of the anchor line and the shroud lines of the secondary canopy (herein referred to collectively as the length of the anchor line) should be equal to the length of the shroud lines 12 plus or minus 10% of the diameter of the main parachute canopy.

The form and shape of the secondary parachute may vary but it is preferably of a conventional flat type made up of gores similar to but smaller than those of a conventional flat type parachute or pilot chute but need not have a vent in its peak.

Figure 5:
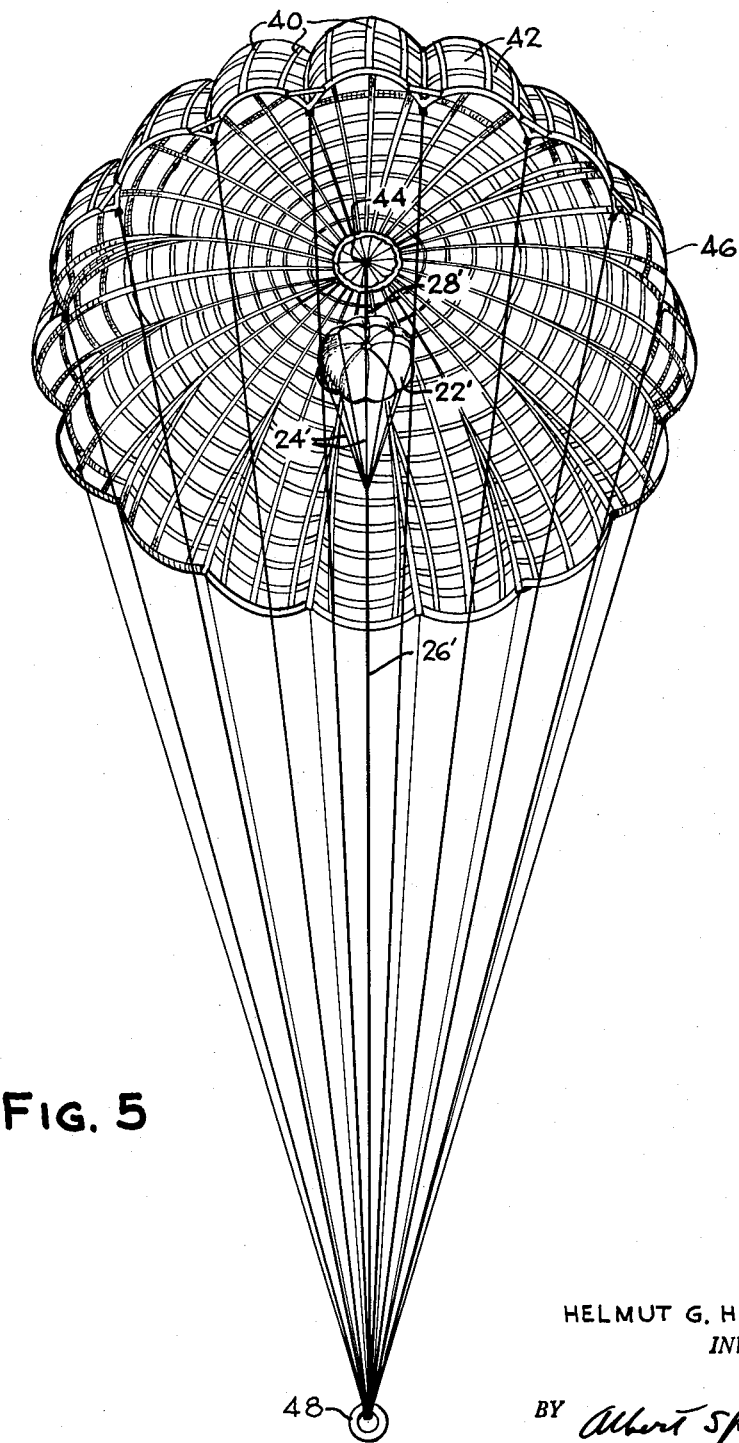
FIG. 5 is a perspective illustrating a ribbon type chute embodying the present invention.

The type, size and construction of the main parachute canopy employed may, of course, be selected as desired for any particular use. Thus, as shown in FIG. 5, the main parachute canopy may be of the ribbon type wherein a plurality of ribbons or bonds of fabric material 40 are arranged so as to present multiple air vents 42 between the peak 44 and the skirt 46 of the parachute canopy. The canopy is connected to a load 48 by the usual shroud lines, and in accordance with the present invention, a secondary parachute 22' which is of the usual flat type and has a closed peak is positioned adjacent the plane of the skirt 46 of the main parachute canopy when the main canopy is in the position indicated in FIG. 2. In order to hold the secondary parachute 22' in this position and increase the rate of opening of the main parachute canopy, the anchor line 26' is connected to the load and to the shroud lines 24' of the secondary parachute. In a similar way, the peak of the secondary parachute 22' is connected to the peak 44 of the main parachute canopy.

Figure 6:
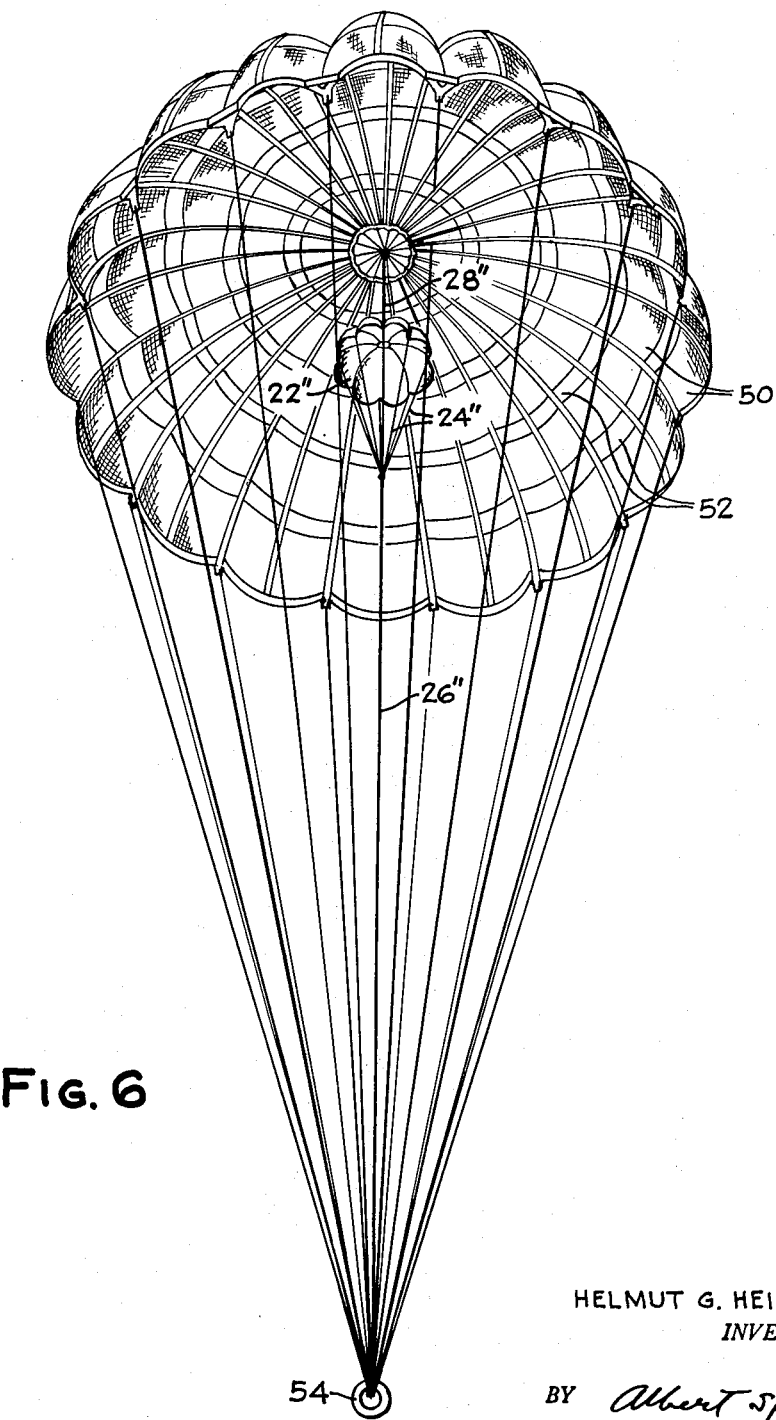
FIG. 6 is a perspective showing a ring slot parachute embodying the present invention.

In FIG. 6 the main parachute canopy illustrated is of the ring slot type wherein circumferentially extending portions of the canopy are shown at 50 and are spaced apart by circumferentially extending slots 52. The secondary parachute 22" is connected to the load 54 and peak 56 of the canopy by the anchor lines 26" and 28" as in the previous forms of the invention. In this way, the secondary parachute serves to accelerate the rate of opening of the main parachute canopy without significantly increasing the shock loading of the parachute.

The present invention is of particular advantage as applied to guide surface parachutes such as those shown and described in my issued Patent No. 2,683,575. However, the invention may be used in combination with ribbon, ring slot and ring sail type parachutes as well as other parachute canopies characterized by a slow opening rate and reduced shock loading as compared with the usual flat type parachute.

The size, type and location of the secondary parachute may be varied depending upon the conditions under which it is anticipated that the parachute will be employed. Thus, for example, the particular size, proportions and locations of the main parachute and the secondary parachute may be quite different when the parachutes are to be used for personnel, cargo, high speed, low speed, high altitude, low altitude, missile recovery and other special purposes for which the invention is adapted.

It will be apparent from the foregoing description that the present invention is capable of considerable variation within the limits indicated. It should, therefore, be understood that the specific embodiment of the invention shown in the drawings and described above is intended to be illustrative only and is not intended to limit the scope of the invention.

I claim:

1. In combination with a main parachute canopy which is of a type characterized by a relatively slow rate of opening as compared with a flat parachute canopy, said parachute canopy having a peak and a skirt, together with shroud lines connected to a load, a secondary air deflecting parachute having a closed peak, said secondary parachute being connected to said load by an anchor line and to the peak of the main parachute canopy by a stay line and generally centered with respect to the skirt of said main parachute canopy, the secondary parachute having a diameter which is from about 10 to 20% of the diameter of the skirt of the main parachute canopy and positioned adjacent the plane of the skirt of the main canopy during the initial period of opening of said main canopy.

2. In combination with a main guide surface parachute canopy having a peak and a skirt, together with shroud lines connected to a load, a secondary air deflecting parachute having a closed peak, said secondary parachute being connected to said load by an anchor line and to the peak of the main guide surface parachute canopy by a stay line and generally centered with respect to the skirt of said main guide surface parachute canopy, the secondary parachute having a diameter which is from about 10 to 20% of the diameter of the skirt of the main parachute canopy and positioned adjacent the plane of the skirt of the main canopy during the initial period of opening of said main canopy.

3. In combination with a main guide surface parachute canopy having a peak and a skirt, together with shroud lines connected to a load, a secondary air deflecting parachute having a closed peak, said secondary parachute being connected to said load by an anchor line and to the peak of the main guide surface parachute canopy by a stay line and generally centered with respect to the skirt of said main guide surface parachute canopy, the secondary parachute having a diameter which is from about 10 to 20% of the diameter of the skirt of the main parachute canopy, said anchor line having a length substantially equal to that of said shroud lines within the limits of about 10% of the diameter of the main parachute canopy.

4. In combination with a main guide surface parachute canopy having a peak and a skirt, together with shroud lines connected to a load, a secondary air deflecting parachute having a closed peak, said secondary parachute being connected to said load by an anchor line and to the peak of the main guide surface parachute canopy by a stay line and generally centered with respect to the skirt of said main parachute canopy, the secondary parachute having a diameter which is from about 10 to 20% of the diameter of the main parachute canopy, said anchor line being of such length as to hold such secondary parachute adjacent but closer to the load than the plane of the skirt of the main guide surface parachute canopy when the latter is partially opened.

5. In combination with a main guide surface parachute canopy having a peak and a skirt, together with shroud lines connected to a load, a secondary air deflecting parachute having a closed peak, said secondary parachute being connected to said load by an anchor line and to the peak of the main guide surface parachute canopy by a stay line and generally centered with respect to the skirt of said main parachute canopy, the secondary parachute having a diameter which is from about 10 to 20% of the diameter of the main parachute canopy, said anchor line being of such length as to hold said secondary parachute adjacent but closer to the peak of the canopy than the plane of the skirt of the main guide surface parachute canopy when the latter is partially opened.

6. In combination with a main guide surface parachute having a parachute canopy with a peak, a skirt, shroud lines extending downwardly from said skirt to a load and guide surface extensions spaced apart about said skirt and extending downwardly from the skirt between adjacent shroud lines, a flat type secondary parachute having a closed peak and a diameter which is from about 10 to 20% of the diameter of the main guide surface parachute canopy, and means connected to said secondary canopy serving to hold the secondary canopy in a position adjacent the plane of the skirt of the main canopy during the initial period of opening of said main canopy.

7. In combination with a main guide surface parachute having a parachute canopy with a peak, a skirt, shroud lines extending downwardly from said skirt to a load and guide surface extensions spaced apart about said skirt and extending downwardly from the skirt between adjacent shroud lines, a flat type secondary parachute having a closed peak and a diameter which is from about 10 to 20% of the diameter of the main guide surface parachute canopy, an anchor line connected to said secondary parachute and to the load, said anchor line having a length equal to that of said shroud lines within the limits of about 10% of the diameter of the main parachute canopy.

References Cited in the file of this patent

UNITED STATES PATENTS

| | | |
|---|---|---|
| 1,499,266 | Vieregg | June 24, 1924 |
| 2,737,358 | Heinrich | Mar. 6, 1956 |

FOREIGN PATENTS

| | | |
|---|---|---|
| 304,243 | Switzerland | Mar. 1, 1955 |
| 1,235 | Netherlands | May 1, 1916 |